United States Patent
Baier et al.

(10) Patent No.: US 7,668,613 B2
(45) Date of Patent: Feb. 23, 2010

(54) MES APPLIANCE INTEGRATED WITH CONTROL MODULES

(75) Inventors: John J. Baier, Mentor, OH (US); Robert J. McGreevy, Oswego, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 153 days.

(21) Appl. No.: 11/864,601

(22) Filed: Sep. 28, 2007

(65) Prior Publication Data

US 2009/0088870 A1    Apr. 2, 2009

(51) Int. Cl.
*G06F 19/00* (2006.01)
*G05B 11/01* (2006.01)
*G05B 15/00* (2006.01)

(52) U.S. Cl. .............................. 700/96; 700/17; 700/83; 700/95; 700/108; 702/81; 702/82; 717/105

(58) Field of Classification Search ................. 700/17, 700/19, 83, 95–96, 108; 702/81–82, 181–182; 707/103–104; 709/203, 219, 231; 717/105
See application file for complete search history.

(56) References Cited

U.S. PATENT DOCUMENTS

| | | | |
|---|---|---|---|
| 6,434,568 B1 * | 8/2002 | Bowman-Amuah | 707/103 R |
| 6,477,580 B1 * | 11/2002 | Bowman-Amuah | 709/231 |
| 6,640,249 B1 * | 10/2003 | Bowman-Amuah | 709/228 |
| 6,775,584 B1 * | 8/2004 | Huang et al. | 700/121 |
| 7,003,367 B2 | 2/2006 | Cheng et al. | |
| 7,031,784 B1 | 4/2006 | Lai et al. | |
| 7,113,845 B1 * | 9/2006 | Behm et al. | 700/169 |
| 7,181,353 B2 * | 2/2007 | Pate et al. | 702/82 |
| 7,299,102 B2 | 11/2007 | Ouchi | |
| 7,317,959 B2 * | 1/2008 | Pfander et al. | 700/97 |
| 2003/0058277 A1 * | 3/2003 | Bowman-Amuah | 345/765 |
| 2005/0039161 A1 | 2/2005 | Pfander et al. | |
| 2005/0187677 A1 * | 8/2005 | Walker | 701/16 |
| 2006/0010018 A1 | 1/2006 | Bouriant | |
| 2006/0106660 A1 | 5/2006 | Varekamp | |

* cited by examiner

*Primary Examiner*—Ramesh B Patel
(74) *Attorney, Agent, or Firm*—Turocy & Watson LLP; William R. Walbrun

(57) ABSTRACT

Activities within various environments (e.g., industrial control environment) can be automated through a number of interchangeable modules configured to perform an action or series of actions. Each interchangeable module can be dedicated to a specific function or task (e.g., quality control, performance) and can take into consideration various business aspects. A sequence in which the actions should be performed can be assigned and the appropriate module automatically initiated based on the sequence. A user can manually select a module in order to have a particular function automatically implemented, such as inserting a quality control module into a rack so that functions relating to quality control are automatically implemented. When a different task is desired, the quality control module can be removed and replaced with a different module.

20 Claims, 10 Drawing Sheets

MES APPLIANCE INTEGRATED WITH CONTROL MODULES

TECHNICAL FIELD

The subject invention relates generally to an industrial process, and more particularly to an industrial process that employs control modules to automate one or more industrial processes.

BACKGROUND

Complete or partial automation in factories, manufacturing facilities, and the like is possible through utilization of industrial control systems. Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables and/or inputs reflecting the status of a control system and changes outputs effecting control of such system.

Industrial control systems have enabled modern factories to become partially or completely automated in many circumstances. A logic processor, such as a programmable logic controller (PLC) lies at the core of the industrial control system. PLCs can be programmed to operate manufacturing processes through logic programs and/or routines. These programs can be stored in memory and generally are executed by the PLC in a sequential manner, although instruction jumping, looping, and interrupt routines are also common. Industrial control systems typically include a plurality of input and output (I/O) modules communicatively coupled to the PLC through a backplane that interferes at a device level to switches, contactors, relays, solenoids and sensors, and other devices along with analog control to provide more complex functions such as Proportional, Integral and Derivative (PID) control or multi-input multi-output (MIMO) or model-reference adaptive control (MRAC).

Communications have also been integrated within the systems, whereby many industrial controllers can communicate through network technologies such as Ethernet, Control Net, Device Net or other network protocols. Accordingly, such control systems are optimized to control and monitor industrial processes, machines, manufacturing equipment, industrial plants, and the like. Generally, industrial controllers utilize the aforementioned technologies along with other technologies to control, cooperate and communicate across multiple and diverse applications Technological advancements have also enabled factory applications to become partially or completely automated. As technology continues to advance it is desirable to utilize the full capabilities of such technology to increase efficiency of a multitude of processes, including worker efficiency.

SUMMARY

The following presents a simplified summary in order to provide a basic understanding of some aspects of the disclosed examples. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with providing software modules that are part of an MES Appliance and can be inserted into or selected from a control rack or other device, wherein each module relates to a specific activity (e.g., quality control, dispatching, performance, management, and so forth). Portions of a workflow can be executed with the MES Appliance. Interaction and pre-configuration of the workflow can be conducted based on control modules programmed to operate within a controller (PLC). Through an instantiation or clarification of an activity or desired output, a code can be automatically loaded or activated in the controller through various interchangeable modules. The interchangeability of the modules allows removal of one or more modules upon completion of a task and insertion of different modules for completion of different tasks or workflows. In accordance with some aspects, the modules are housed in a rack at substantially the same time and each individual operation is performed autonomously, mitigating the need for a user to interchange modules.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
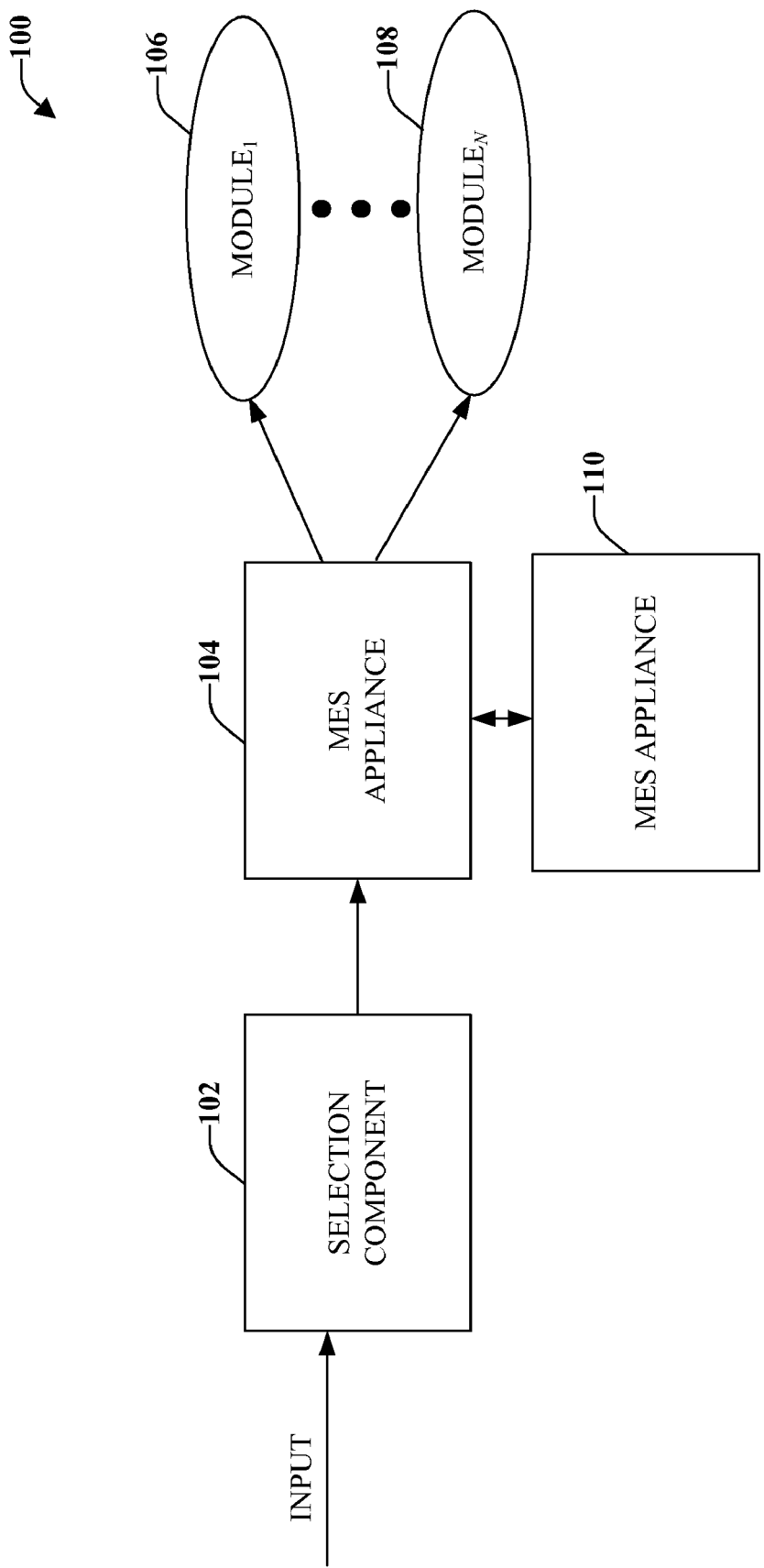
FIG. 1 illustrates an example system that automatically optimizes an activity through initiation of an MES Appliance and control modules within an industrial automation environment.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well known structures and devices are shown in block diagram form in order to facilitate describing these embodiments.

As used in this application, the terms "component," "engine," "module," "system," "controller," "device," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

The various embodiments disclosed herein can operate separately or in conjunction with various systems including Advanced Process control, various business systems, machine or manufacturing execution systems (MES), an MES Appliance, and so forth. A MES system can include an Enterprise business system, Quality system, Warehouse and supply chain systems, and so forth. An MES system can include key functions, such as detailed scheduling, work order execution and dispatching, definition management, resource management, data collection, and order management. An MES Appliance can perform processing related to various aspects (e.g., business logic, data storage, and so on), which can be incorporated on software modules that can operate various aspects of a business, manufacturing environment and the like and can operate and be serviced utilizing various information technology resources. The various systems can directly or indirectly derive their value out of configuration and interaction with Manufacturing/Automation systems and/or other MES type systems. Additionally, the various aspects can be employed in an industrial automation environment and/or in other environments in which such aspects are deemed appropriate.

Referring initially to FIG. 1, illustrated is an example system 100 that automatically optimizes an activity through initiation of an MES Appliance and software or control modules within an industrial automation environment. System 100 can be configured to interpret a desired end result and utilize one or more interchangeable modules in order to achieve the desired end result. Individual modules can be manually inserted and removed from a control rack or housing based on the desired end result. In accordance with some aspects, multiple modules are housed within a control rack at substantially the same time and system 100 selectively initiates one or more modules in sequence in order to automatically achieve the desired end result. Each of the interchangeable modules can be dedicated for a particular function.

In further detail, system 100 includes a selection component 102 that can be configured to accept an input from a user and/or entity (e.g., the Internet, another system, a computer and so forth), hereinafter referred to as user. The input can include a desired end result (e.g., "perform a quality check", "create product according to specifications", and so forth) that can be expressed as a high-level overview or in other terms, such as a goal, outcome, best case scenario, desired result, end product and so forth and can include explicit details relating the desired end result. The input can be expressed in natural language format, input through a keyboard, spoken (e.g., audible), selected from a listed, communicated through drag-and-drop functionality (e.g., icons), or through other manners that can be understood by a PLC, computer, machine, or other device responsible for executing system 100 functions.

In accordance with some aspects, the input can be extrinsic or intrinsic evidence received or created by system 100. For example, a sensor (e.g., photoelectric eye, weight sensor, and so forth) or another indicator means can determine that a part has arrived at a certain area or manufacturing process. The sensor or indicator can provide the information (e.g., input) to system 100, which infers that a particular operation should be performed on the part (e.g., the operation generally performed at that manufacturing area).

Also included in system 100 is an MES Appliance 104 that can be configured to receive the desired end result information and determine one or more steps or actions (e.g., workflow) that should be performed in order to achieve the end result. The one or more steps or actions can relate to a process or function associated with a manufacturing, business or other process. Such processes or functions can be autonomously performed by one or more interchangeable modules, illustrated as Module$_1$ 106 through Module$_N$ 108, wherein N is an integer. The workflow can be constructed based on control modules 106, 108 that can be configured to operate in a controller (PLC).

Each module 106 and 108 can be configured to perform one or more actions or series of actions autonomously and/or can be dedicated to a particular function or process, which can be one or more functions distinct from functions carried out by each of the other modules 106 and 108. Additionally or alternatively, each module 106 and 108 can be configured to logically implement functions through interaction with external devices (e.g., sensors, hydraulic components, machinery, tooling, computer-implemented devices, human interaction, and so forth). Each module 106 and 108 can selectively control the one or more external devices or implement an action so that the external devices are activated (e.g., send a notice to a user or another component) in order to facilitate completion of the function or process in a manner or sequence determined by MES Appliance 104. In accordance with some aspects, MES Appliance 104 can execute one or more functions.

As MES Appliance 104 determines which steps or actions need to be performed, the respective module 106, 108 configured to perform the action (or subset of the action) can be selectively chosen. As needed, MES Appliance 104 can invoke or initiate the module 106, 108 to carry out at least one action at a proper time (e.g., in a certain sequence) in order to achieve the desired end result. The modules 106, 108 can be pre-configured (e.g., programmed) to perform the desired action and/or can be dynamically configured and/or modified by MES Appliance 104 based on the desired end result. As such, if a control module 106, 108 is not available to perform a specific function, MES Appliance 104 can facilitate programming of a control module so that the actions can be performed automatically.

For example, a desired end result can be received as an input, such as "Produce 750 widgets of different lengths—125 are 12 inches long, 175 are 13.75 inches long, 50 are 6 inches long and 400 are 17 inches long, and powder coat all with color battleship grey." MES Appliance 104 might determine that a first interchangeable module, such as a module that carries out functions associated with a fabricating or cutting process; a second interchangeable module, such as a module that carries out functions associated with a powder coating process; and a third module that carries out functions associated with a quality monitoring process, should be utilized. MES Appliance 104 can selectively invoke actions of each of the three modules in a particular, predetermined order (e.g., sequence), so that the widgets are produced as desired. In accordance with some aspects, MES Appliance 104 provides a message or other prompt requesting manual loading of a particular interchangeable module in a control rack, such as if multiple modules are not housed in a control rack at substantially the same time.

In accordance with some aspects, MES Appliance 104 solicits feedback relating to the actions or steps that will be performed, in order to mitigate misunderstandings and/or obtain information relating to system 100 performance and recommended improvements, if any. Such feedback requests can be presented to a user through various means including a message (e.g., pop-up message, email message), a selectable input (e.g., answer to a question) or through other means. Such feedback can be solicited if a received input (e.g., goal, desired end result) is not clear or could be interpreted in two or more different ways, which might conflict with each other. For example, a user can request that a quality performance check be performed on the widgets in the above example. MES Appliance 104 might not know if the lengths, color, material strength and/or another quality check should be performed. A message can be sent to user so that further clarification is provided (e.g., only check length and color). This type of feedback can also mitigate wasted resources such as time and costs associated with performing functions that are not necessary (e.g., checking material strength in the above example).

Thus, system 100 can receive a request to perform an action or a series of actions, which can be expressed as a high-level desired output, and can automatically implement the actions while mitigating further user interaction, unless further clarification is necessary. As such, full functionalities of system 100 and related components can be utilized to increase productivity and automate a multitude of industrial processes.

Figure 2:
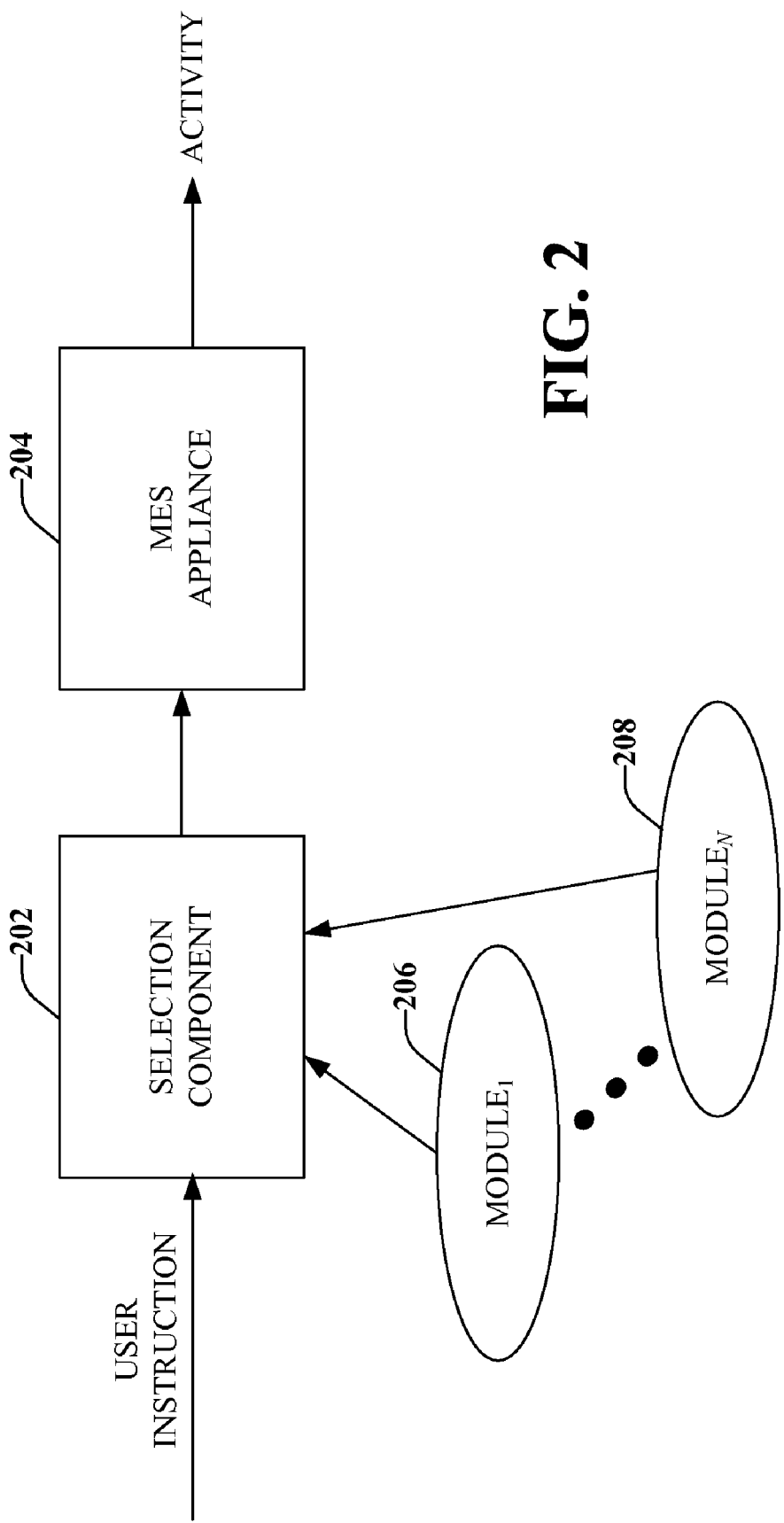
FIG. 2 illustrates a related system that facilitates activities within an industrial control environment based on interchangeable modules selected by a user.

FIG. 2 illustrates a related system 200 that facilitates activities within an industrial control environment based on interchangeable modules selected by a user. In accordance with some aspects, multiple interchangeable modules might not be housed in a control rack (or other housing) at substantially the same time or a desired action is not currently represented by a module included in the control rack. In accordance with this aspect, a user can selectively load or place (e.g., physically or virtually) an interchangeable module in a control rack in order for system 200 to automatically execute one or more desired functions.

In more detail, system 200 includes a selection component 202 that can be configured to receive one or more user instructions relating to a desired end result or an action that should be performed. An MES Appliance 204 can interpret and define the one or more user instructions and initiate actions to be performed in order to achieve the end result based on the user instructions. The actions can be expressed as a workflow. Additionally or alternatively, MES Appliance 204 can create necessary actions and program or modify a control module so that the actions can be automatically performed by system 200.

In accordance with this aspect, interchangeable modules can be manually inserted into a control rack and/or manually selected (e.g., already housed in a control rack and manually selected as a different action is desired). The interchangeable modules are labeled Module$_1$ 206 through Module$_N$ 208, where N is an integer. For example, a user can be performing functions at a manufacturing stage or area and is responsible for completing certain actions. As each action is completed, the user can interchange modules 206, 208 depending on the next operation desired. MES Appliance 204 can initiate the control module at the proper time. For example, a user might load or install a control module prior to an associated step within the workflow that utilizes the control module. MES Appliance 204 can selectively invoke the module when the step associated with the control module is ready to be performed.

Each module can perform a completely different function. Thus, if a painting process has just been completed on a part or a multitude of parts, the user can select a module associated with a quality function and selects a quality module (e.g., insert the module in control rack, manually initiate the module) so that functions associated with quality are performed on the part (e.g., reviewing the paint color to ensure it is the correct color, shade, gloss quality, and so forth).

Thus, a user can load or select a module in order for such actions associated with that control module to be automatically performed by system 200. In accordance with some aspects, automatic initiation of control modules by MES Appliance 204 and manual selection by a user can be performed at substantially the same time. For example, fifty manifolds out of two hundred have had ports drilled. An error report or non-conforming notice might be received from a mechanic, floor assembler or machine tester indicating that the ports have been drilled in the incorrect location or that there is another problem (e.g., size of the ports is incorrect). A manual override of a sequence determined by MES Appliance 204 (e.g., place a next manifold in position for drilling) might be received so that a previous (or the current) manifold being drilled is tested to determine if it is in compliance with a specification. If the manifold is in compliance, system 200 can continue automatic performance of the action. If the manifold is not in compliance, system 200 can automatically take action to correct the defect. In accordance with some aspects, system 200 can solicit manual inputs from a user in order to facilitate correction of the problem. In such a manner, system 200 can facilitate continuous improvement while automating one or more functions.

Figure 3:
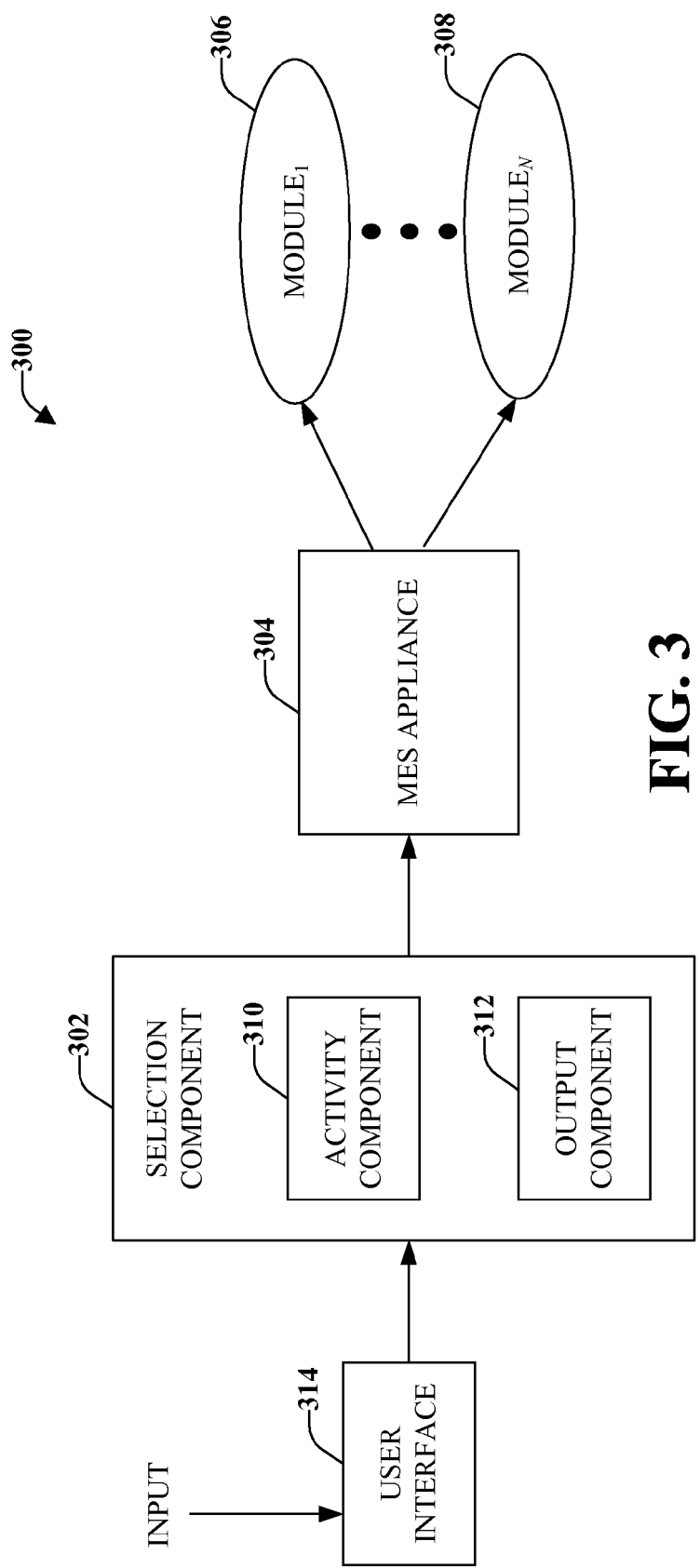
FIG. 3 illustrates an example system that utilizes interchangeable modules in order to implement various processes in a logical order.

With reference now to FIG. 3, illustrated is an example system 300 that utilizes interchangeable modules in order to implement various processes in a logical order. System 300 is similar to the systems of the above figures and includes a selection module 302 that can receive a user input and conveys the input to an MES Appliance 304. MES Appliance 304 can be configured to selectively employ one or more interchangeable modules (Module$_1$ 606 through Module$_N$ 308, where N is an integer) in order to complete various tasks and/or to autonomously perform task to achieve a desired result. For example, a performance module can include information about which items to capture, such as uptime, downtime, performance, rate, throughput, scrap and so forth. Such items can be automatically evaluated, logged, and monitored by performance module. In accordance with some aspects, MES Appliance 304 can be configured to execution portions of the workflow.

Selection component 302 can include an activity component 310 that can be configured to maintain information relating to various activities or a desired result that can be requested by a user, can provide a structure for the input, or combinations thereof. Such activities can include a multitude of processes or business steps. For example, the processes can relate to different stages of a manufacturing process. The business steps can relate to various business goals or standard operating procedures, which should be conformed to while achieving an end result. Maintaining information relating to the activities or result can allow a user to input repeated commands in a shorthand format, thus, saving time while allowing system 300 to more quickly implementing actions.

Activity component 310 can access the maintained information through one or more repositories. The information can include historical data, user data, company data, business goals, manufacturing goals, standard operating procedure data, and so forth. The repositories can be memory and/or some other medium that can store information. By way of example, and not limitation, the repositories can include non-volatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

An output component 312 can be configured to transmit the request in an understandable format to MES Appliance 304. Output component 312 can communicate with MES Appliance 304 in any manner that is known or becomes known. The communication protocol between output component 312, selection component 302 and MES Appliance 304 can employ any wired or wireless techniques. For instance, in one wired aspect, an Ethernet architecture can be employed. Moreover, in wireless aspects, an IEEE 802.11, Bluetooth™, Infra Red, Internet, or the like can be employed.

Output component 312 can further be configured to determine information that should be conveyed so that MES Appliance 304 can carry out its various functions. For example, a user might request a certain action based on installing a particular control module into a rack. Output component 312 can relay the information associated with the control module to the MES Appliance 304 but might not relay the fact that the user manually inserted the control module.

Associated with selection component 302 can be a user interface component 310 that can be configured to accept a user input and present results of the input. For example, a user can select a certain action by utilizing drag-and-drop functionality associated with a display screen. A user can select the desired action by pulling an icon, for example, into a certain area of the display screen (although other manners of communicating the input can be utilized with the disclosed aspects). At substantially the same time as the selection is made, the information can be relayed to MES Appliance 304 and the various functions associated therewith performed. As such, MES Appliance 304 can interact and, in accordance with some aspects, pre-configure a workflow based on control modules configured to run in a controller (PLC).

The user interface component 310 can provide a graphical user interface (GUI), a command line interface, a speech interface, Natural Language text interface, and the like. For example, a GUI can be rendered that provides a user with a region or means to load, import, select, read, etc. the user input, and can include a region to present the results of the interpretation of the user input (e.g., information relating to how system 300 will implement the various actions). These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with user interface component 310 to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
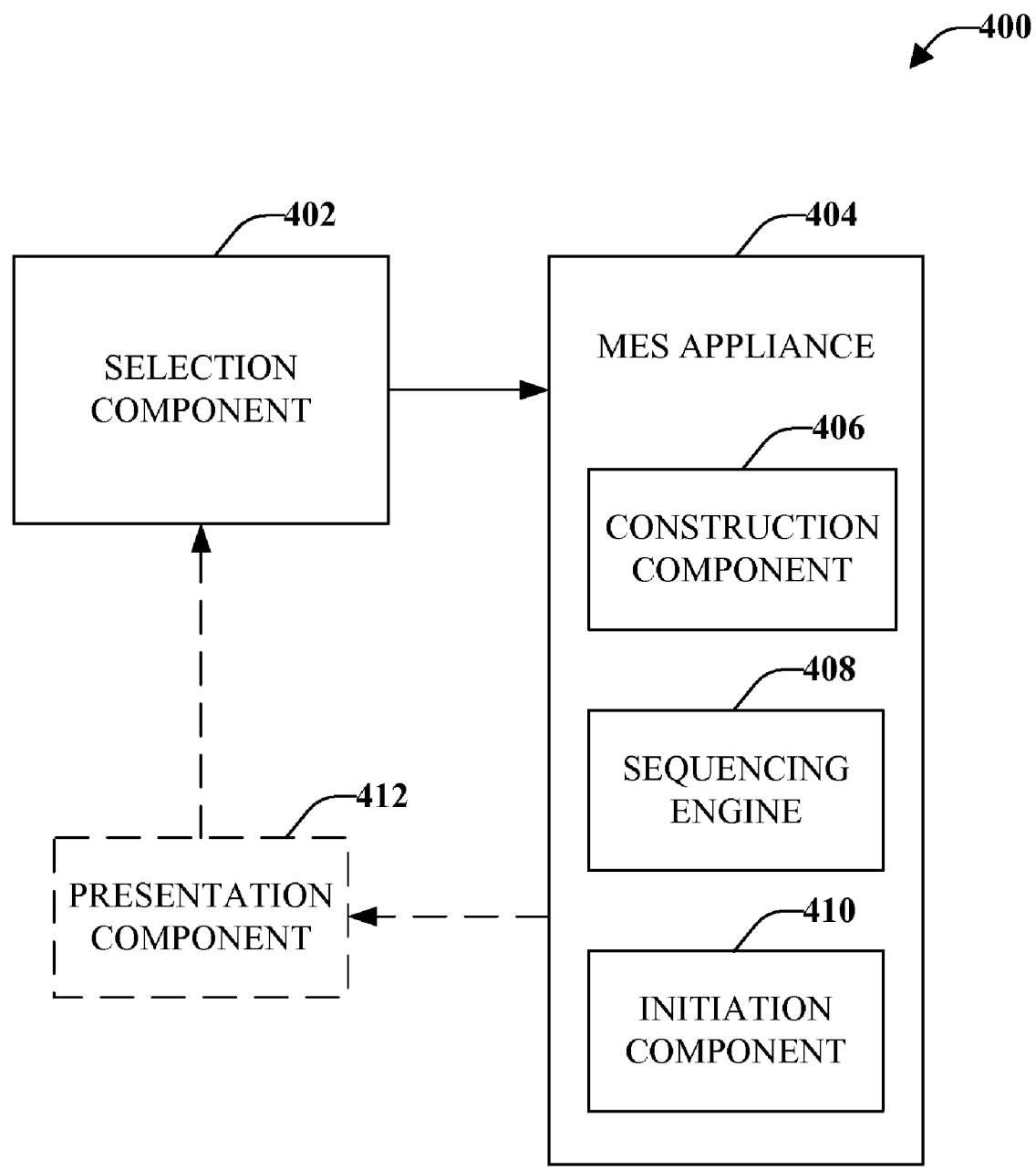
FIG. 4 illustrates another example system for selectively automating activity through utilization of a sequencing engine.

FIG. 4 illustrates another example system 400 for selectively automating activity through utilization of a sequencing engine. System 400 can include a selection component 402 that can be configured to receive an input that provides information related to a desired action or end result, which can be analyzed by MES Appliance t 404. MES Appliance 404 can determine if one or more existing interchangeable modules can be utilized to implement activities that will produce the desired end results. If there is not an existing (e.g., pre-configured) module for the desired activities, a construction component 406, associated with MES Appliance 404, can configure one or more modules, or sub-portions thereof for the activities. The configured modules might be existing modules or might be a new module configured for a specific task.

A sequencing engine 408 can be configured to determine a sequence for calling or initiating more than one module (e.g., performing one or more actions), if more than one module is necessary to achieve the desired end result. In accordance with some aspects, sequencing engine 408 can be configured to initiate sub-portions of control modules, based on the desired end result. An initiation component 410 can be configured to initiate each module or sub-portions thereof in an order determined by sequencing engine 408.

Additionally, an optional presentation component 412 can be configured to present results or other information to a user through selection component 402 and/or a user interface component. Presentation component 412 can request feedback though a feedback loop to determine if the desired end result was in fact achieved or if changes are necessary. A user can respond to the request and, if changes are necessary, system 400 can automatically make necessary changes until the desired end result is achieved. In such a manner, system 400 can enter a continuous learning stage for on-going improvement.

Figure 5:
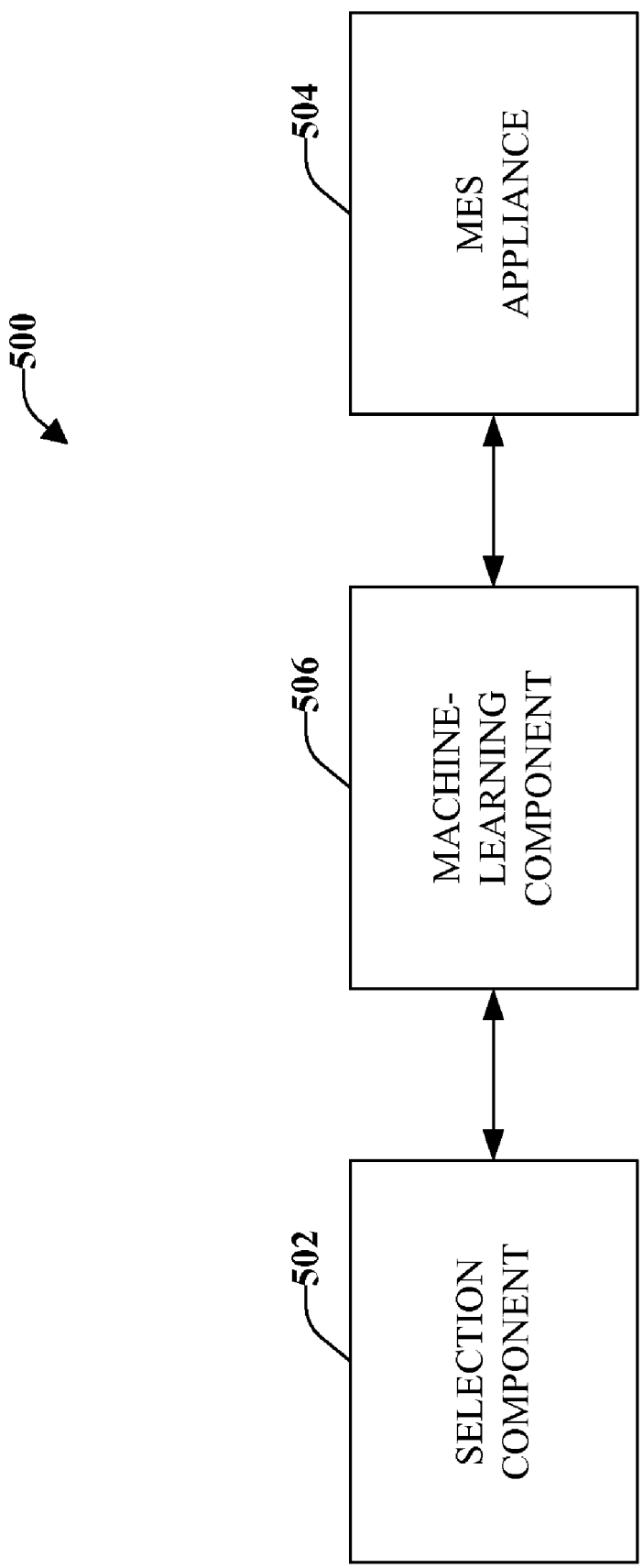
FIG. 5 illustrates an example system that employs machine learning techniques that can facilitate automating one or more features in accordance with the one or more aspects disclosed herein.

FIG. 5 illustrates a system 500 that employs machine learning techniques that can facilitate automating one or more features in accordance with the one or more aspects disclosed herein. The various aspects (e.g., in connection with receiving a desired output, determining how to achieve the desired output though initiation of one or more control modules and to automatically controlling activities through the control modules to achieve the intent) can employ various machine learning-based schemes for carrying out various aspects thereof.

The machine learning component 506 can employ various machine learning techniques, algorithms, approaches, etc. to identify and/or implement actions (e.g., artificial intelligence, rules based logic and so forth). For example, the machine learning component 506 can employ a machine learning algorithm that can reason about or infer which control modules should be utilized for a particular output, a sequence (e.g., workflow) in which to call each of the modules, and so forth, which can be facilitated through an automatic classifier system and process. In another example, a process for determining whether a particular control module should be modified or re-configured based on various external (e.g., parts are non-conforming, feedback from a user) and internal factors can be facilitated through an automatic classifier system and process. Inference can be employed to identify actions that will produce a desired end result and/or can generate a probability distribution over the identified actions as potential process steps. Such inferences can be probabilistic—that is, the computation of a probability distribution over entities identified within the data. Inference can also refer to techniques employed for rendering higher-level decisions.

Various classification (explicitly and/or implicitly trained) schemes and/or systems (e.g., boosting classifiers, transduction classifiers, inductive classifiers, support vector machines, neural networks, expert systems, Bayesian belief networks, fuzzy logic, data fusion engines . . . ) can be employed in connection with performing automatic sequencing of activities and/or activity sets in accordance with the disclosed examples. In general, a classifier is a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to automatically differentiate text from other entities within an image. One example of a suitable classifier is a support vector machine (SVM), which, in general, operates by finding a hypersurface, which attempts to split triggering criteria from non-triggering criteria, in the space of possible inputs. This can make the classification suitable for testing samples, data, etc. that is near, but not identical to training data. The classifier(s) can be used to automatically learn and perform a number of functions, including but not limited to determining according to a received intent which control modules to modify, create and/ or select, when to initiate a control module, etc. The criteria can include, but is not limited to, received feedback based on performance or recommended activities or a sequence of activities described by the received intent, the type of activity, the control module performing the activity, the importance of the activity, problems experienced with performing the activity and so forth.

In accordance with an alternate aspect, an implementation scheme (e.g., rule) can be applied to control and/or regulate which control modules are used for performance of activities, generation/modification of control modules and/or selectively changing a control module performing the activity (e.g., proceeding to a next step). It will be appreciated that the rules-based implementation can automatically and/or dynamically modify various actions performed by one or more control modules based upon a predefined desired intent. In response thereto, the rule-based implementation can automatically determine a sequence (e.g., workflow) to call the control modules to achieve the intent, assign one or more steps to various control modules and/or suggest alternative control modules to achieve the intent by employing a pre-defined and/or programmed rule(s) based upon any desired criteria (e.g., desired output, number of activities necessary, type of activities needed, activity length, activity importance, resource performing the activity, and so forth).

By way of example, a user can establish a rule that can require a trustworthy flag and/or certificate to utilize a control module whereas, other control modules within a particular system may not require such security credentials. It is to be appreciated that any preference can be produced through pre-defined or pre-programmed forms of a rule. It is to be appreciated that the rules-based logic can be employed in addition to or in place of the artificial-based components and/or machine learning component 506. For example, a event that is rule-based can be triggered by a combination of factors, such as if there is a peg "x" plus a peg "y" in a certain place, both pegs can be integrated to create a peg "z".

In view of the exemplary systems shown and described above, methodologies that may be implemented in accordance with the disclosed subject matter, will be better appreciated with reference to the flow charts of FIGS. 6-9. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
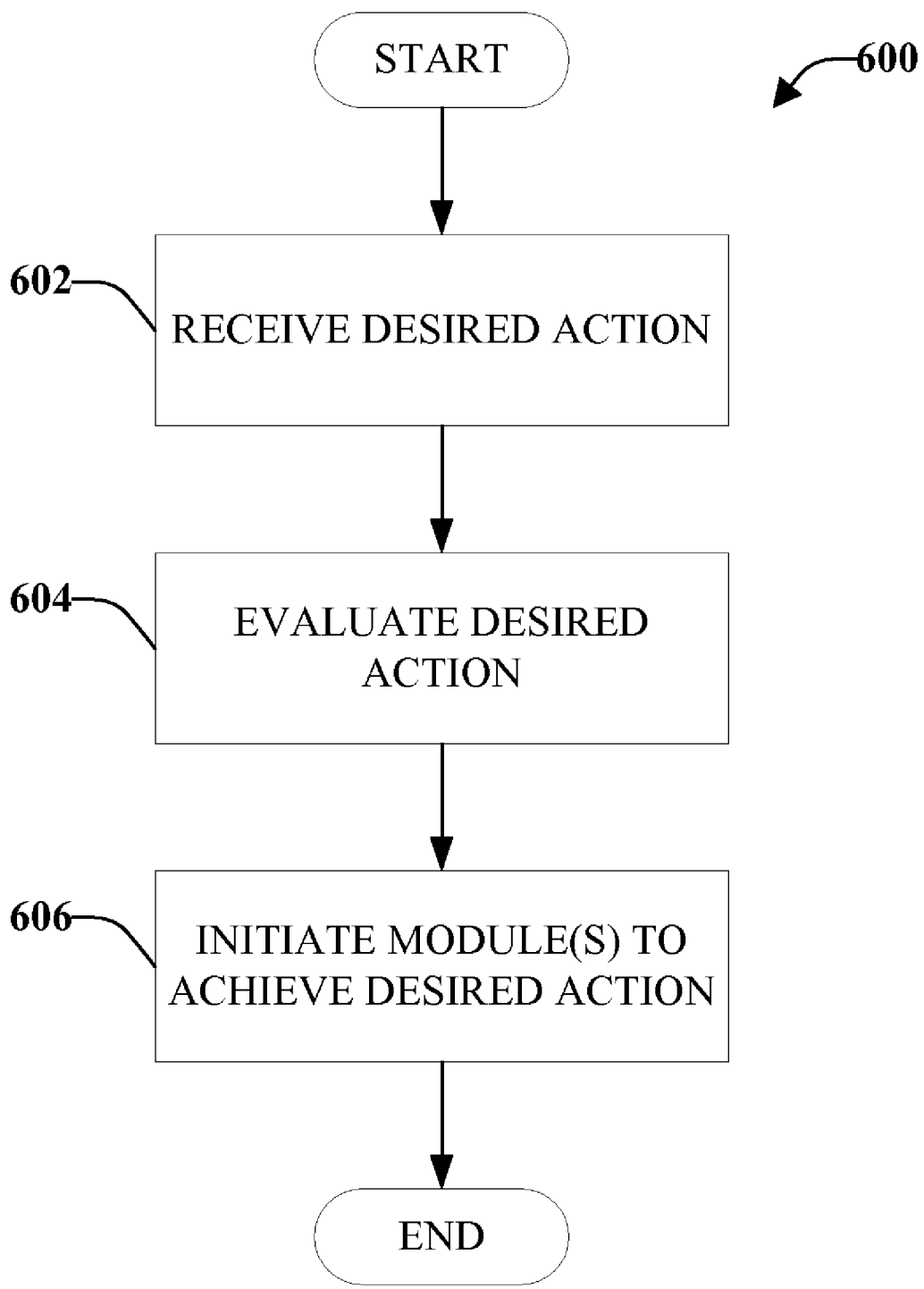
FIG. 6 illustrates a method for utilizing control modules integrated with an MES Appliance in order to automate one or more actions to achieve a desired end result.

FIG. 6 illustrates a method 600 for utilizing control modules integrated with an MES Appliance in order to automate one or more actions to achieve a desired end result. An MES Appliance integrating software or control modules allows one or more actions or steps in a process (e.g., workflow) to be automatically implemented and performed. Such implementation and performance can be facilitated by control modules that can be loaded or inserted into a control rack, MES Appliance or other equipment, or housed separately in order to carry out the functions to achieve a desired end result. The control modules can be interchangeable and can be manually inserted into a housing or selected based upon a desired action, or dynamically selected by method 600 at the proper time to carry out one or more actions (e.g., more than one module loaded in a control rack at substantially the same time).

Method 600 starts, at 602, when a desired action is received from a user and/or entity. The desired action can be manually input (e.g., spoken, verbal, selections made on a display screen, pressing or activating control buttons (e.g., on a machine control panel), drag-and-drop functionality, or through other means. In accordance with some aspects, the input can be received or acknowledged based on insertion (e.g., manually) of a control module in a control rack or selection of a module automatically (e.g., from a multitude of modules) based on a next action to be performed. In accordance with some aspects, the input is received based on extrinsic evidence, such as arrival of a part at a certain location or destination (e.g., through interaction with a sensor or detector).

At 604, the desired action is evaluated to determine which modules should be used to achieve the desired action. The evaluation can include associating key words or phrases (e.g., paint) with a directory or database that corresponds the key words or phrases with a particular control module (e.g., program or sub-portion of program associated with module). In the situation where a control module is manually inserted or selected (e.g., a user determines which module to use), a determination is made, at 604, regarding whether the entire program contained in the control module or only a subset thereof should be utilized to achieve the desired action or end result.

Method 600 continues, at 606, with initiation of the one or more modules in order to carry out the desired action. If more than one module is to be utilized, method 600 can sequentially invoke the modules until completion of the desired result. In such a manner, a user simply requests a desired action and method 600 autonomously configures and implements the necessary actions with little, if any, subsequent user interaction.

Figure 7:
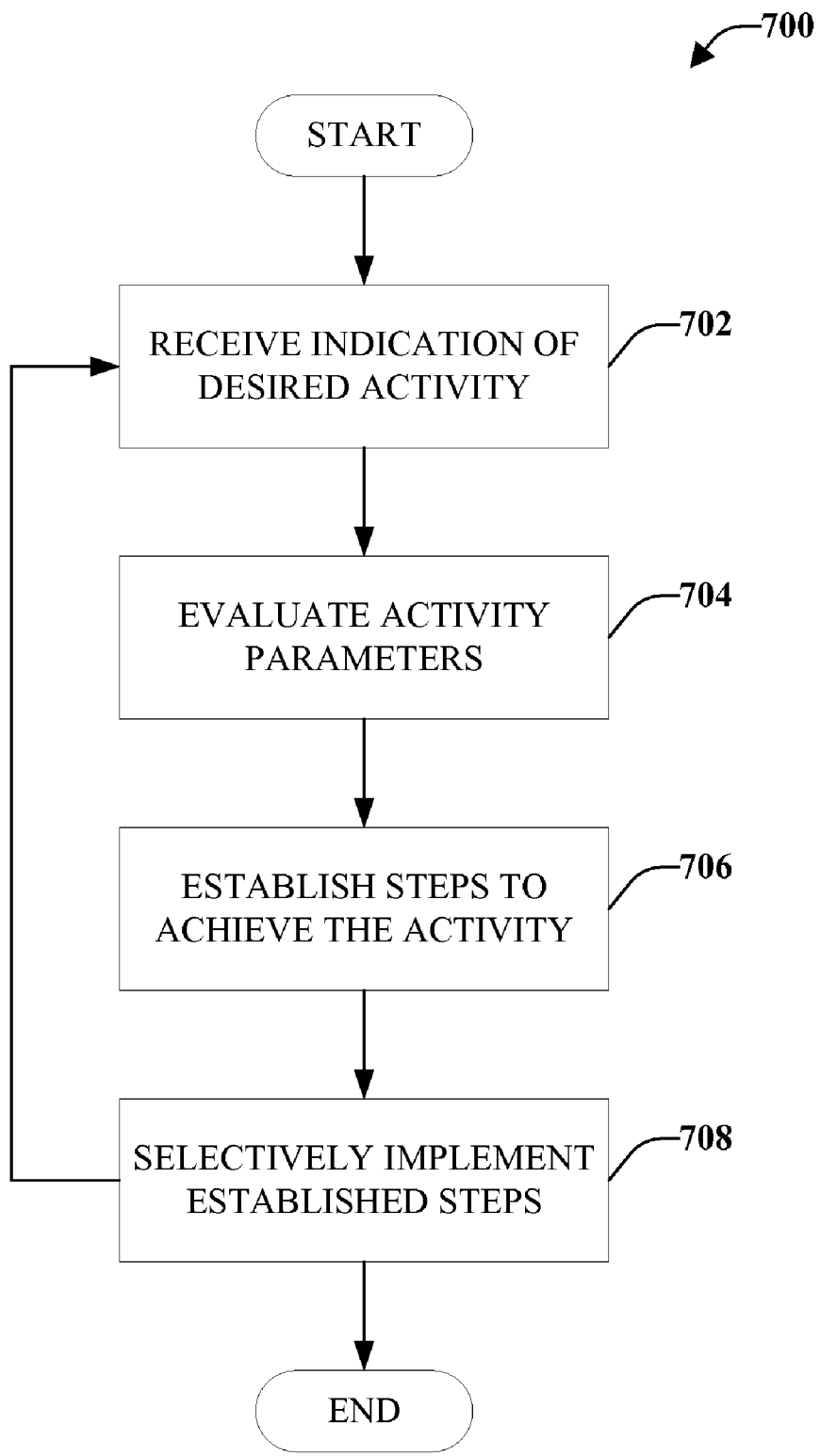
FIG. 7 illustrates another method for dynamically performing actions in order to implement and accomplish a stated intent.

With reference now to FIG. 7, illustrated is a method 700 for dynamically performing actions in order to implement and accomplish a user intent. At 702, an indication of a desired activity is received. This indication can be selection of a control module, insertion of a control module into a rack, or through other intrinsic or extrinsic evidence. Parameters associated with the desired activity are evaluated, at 704. Such evaluation can include determining whether one or more existing control module (or a sub-portion thereof) can be utilized to achieve the desired activity. In accordance with some aspects, the evaluation can include determining if one or more control modules can be modified, or a control module created (e.g., programmed) in order to achieve the desired activity. If a control module cannot be modified and/or created (e.g., desired activity cannot be achieved) a notification can be sent in response to the received request for a desired activity indicating the failure.

If control modules are available or can be created, at 706 steps to achieve the activity are established. Such steps can include a sequence of which control modules to use and/or which programs contained in a control module can be used to achieve the desired result. The sequence can include interaction with various systems, components and/or human interaction in order to perform the actions necessary to achieve the desired activity.

At 708, the established steps are selectively implemented. If a manual input is required to carryout one of the steps, the implementation might include providing a prompt or other perceivable (e.g., visual, audible) means for providing notification of the necessary manual input. Method can continue at 702, when a subsequent indication of a desired activity is received, which could be a next action that should be performed.

Method 700 can facilitate consistent diagnostics in a modular fashion. As an example, a machine might have been retooled and now additional functionality or capability or a requirement related to tracking can be performed by using an existing module or adding more modules. The various modules can be moved from location to location (e.g., modular) so that various areas can perform consistent diagnostics, such as on the same batch of parts or other items.

Figure 8:
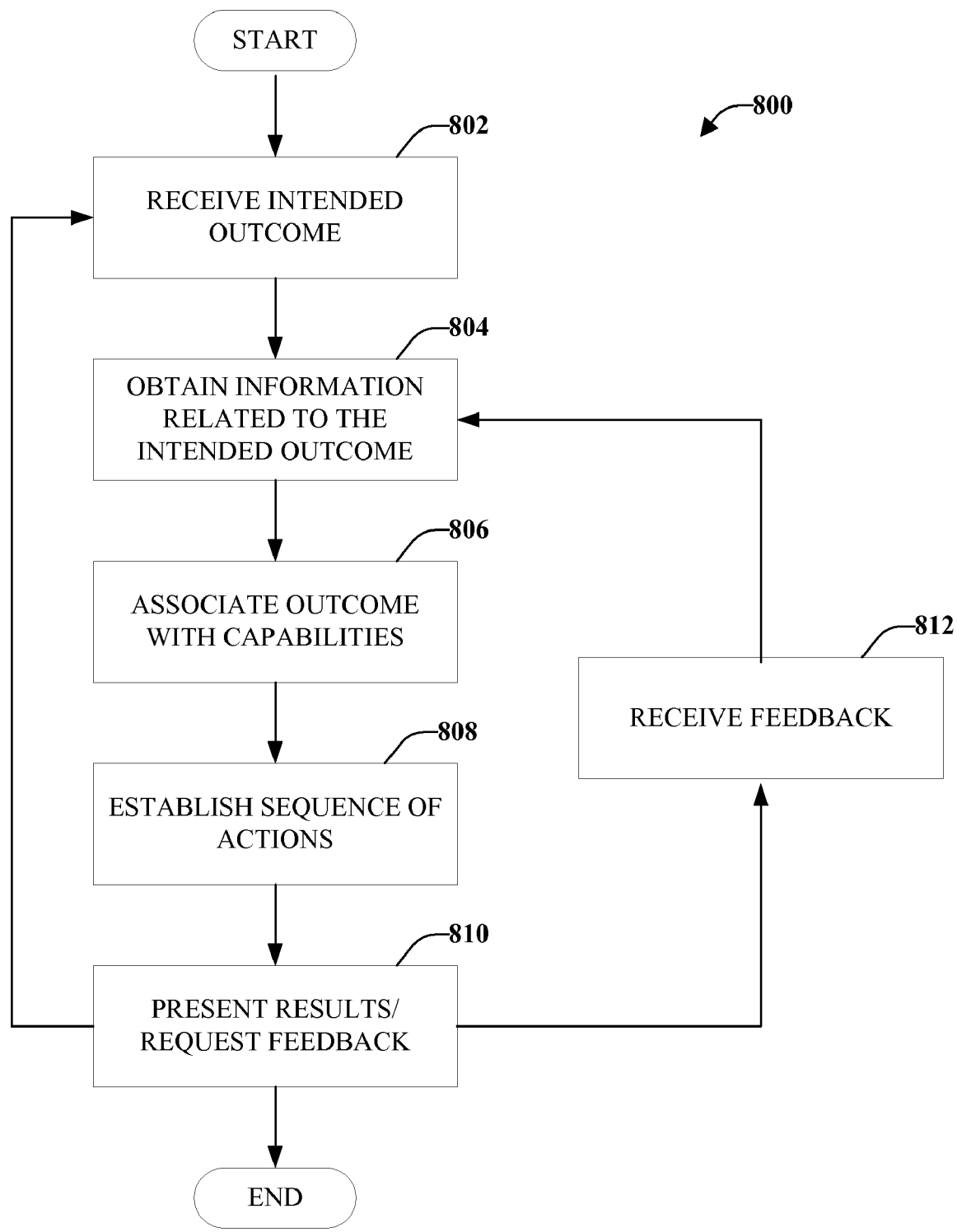
FIG. 8 illustrates a method for automatically implementing one or more processes and obtaining feedback information relating to the implementation and/or the output.

FIG. 8 illustrates a method 800 for automatically implementing one or more processes and obtaining feedback information relating to the implementation and/or the output. Feedback can allow method 800 to provide continuous improvement and/or conformance with a desired action.

At 802, an intended outcome is received from a user and/or entity. The intended outcome can be presented in various formats (e.g., written, verbal) or through various means (e.g., drag-and-drop functionality, selection from an operator control, and so forth). Information related to the intended outcome is obtained, at 804. Such information can relate to an end result or other action. At 806, the intended outcome is associated with capabilities of one or more module. Each module can be programmed to perform an action or series of actions (e.g., all actions associated with a particular process or manufacturing stage).

A sequence of actions is established, at 808. The sequence can include which portions of the control module should be executed and/or if different control modules should be used, and when to initiate each of the different control modules. The expected results and a request for feedback can be sent, at 810. The feedback can include a request for confirmation that the established sequence of actions will achieve the intended outcome. In accordance with some aspects, the requested feedback can relate to the final result (e.g., did the actions performed result in the desired outcome?). The feedback can be received, at 812, and based on the type of feedback (e.g., did/did not result in desired outcome), further information can be captured, at 804, in order to change (or not change) the automatic actions. If the feedback indicates that the performance is poor, the desired action can be reevaluated to establish different steps or other action.

In accordance with some aspects, feedback is not requested and method 800 continues, at 802, when a next intended outcome is received. It is to be understood that this act can be continuous such that any number of intended outcomes can be received at substantially the same time or at different times.

Figure 9:
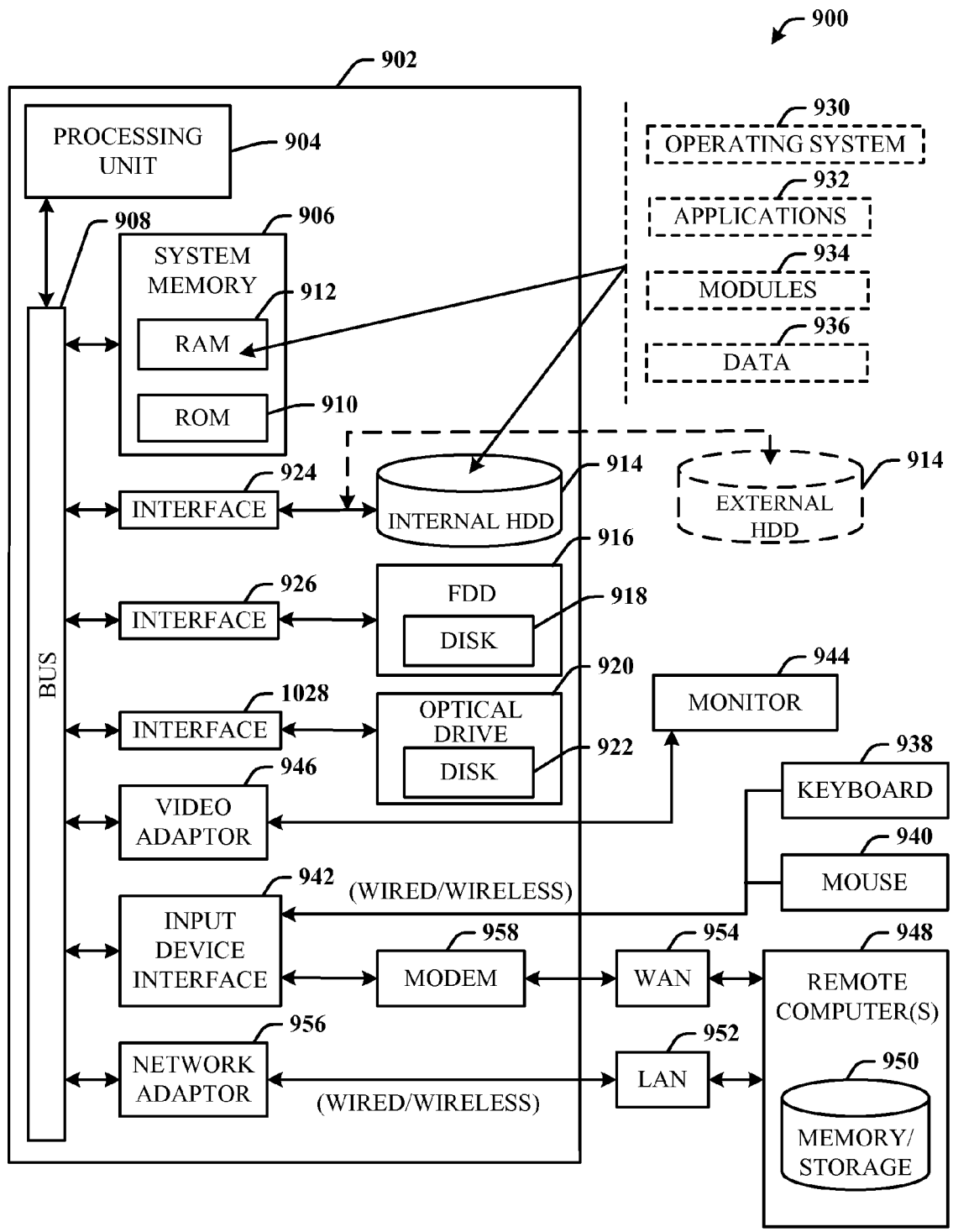
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
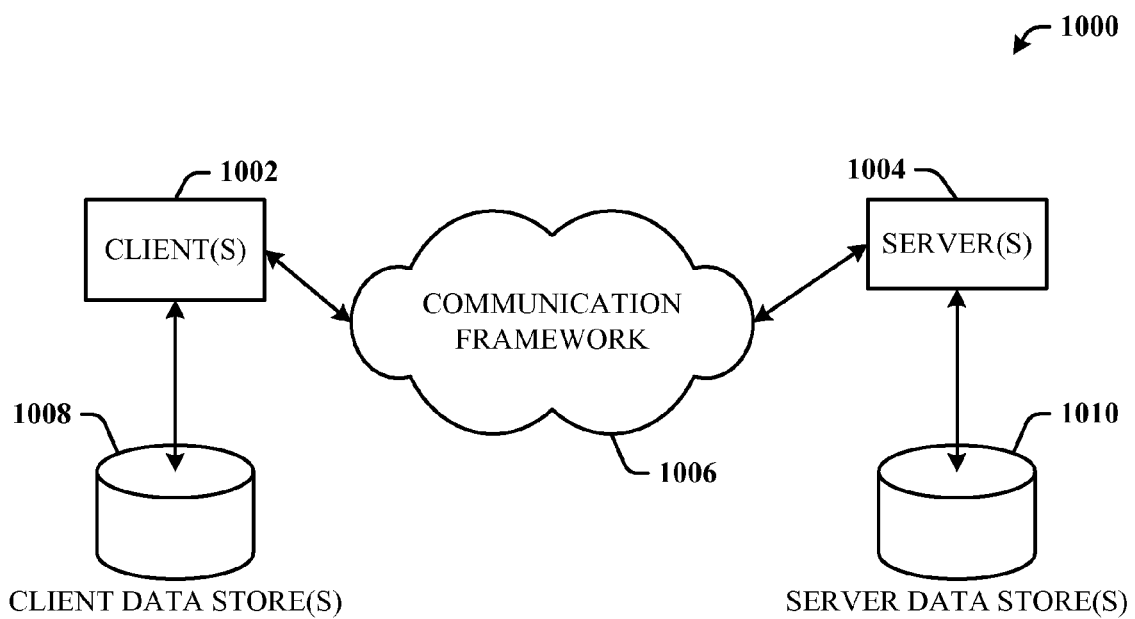
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more clients 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more servers 1004. The servers 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data stores 1008 that can be employed to store information local to the client(s) 1002 (e.g., cookie(s) and/or associated contextual information). Similarly, the server(s) 1004 are operatively connected to one or more server data stores 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims. The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), and so forth), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

What is claimed is:

1. A system for autonomously performing activities in an industrial automation environment, comprising:
    a selection component that receives a desired end result; and
    a manufacturing execution system (MES) Appliance that determines one or more actions needed to achieve the desired end result and selectively invokes at least one interchangeable module to perform the one or more actions.

2. The system of claim 1, wherein the MES Appliance initiates the at least one interchangeable module at a proper time to achieve the desired end result.

3. The system of claim 1, wherein the MES Appliance dynamically configures the at least one interchangeable module to perform the one or more action.

4. The system of claim 1, wherein the MES Appliance solicits feedback relating to the selected one or more actions, system performance, or recommended improvements.

5. The system of claim 1, further comprising an activity component that maintains information relating to the desired end result, or a structure of an input, or combinations thereof.

6. The system of claim 1, further comprising a user interface component that accepts a user input that includes the desired end result.

7. The system of claim 1, further comprising a sequencing engine that determines a sequence for performing the one or more actions.

8. The system of claim 7, wherein the sequencing engine initiates a sub-portion of the at least one interchangeable module.

9. The system of claim 1, further comprising a construction component that configures the at least one interchangeable module to perform the one or more actions.

10. The system of claim 1, further comprising a presentation component that requests feedback relating to the desired end result.

11. The system of claim 1, wherein the at least one interchangeable module is manually selected.

12. The system of claim 1, further comprising a machine learning component that facilitates automation of one or more system components.

13. A method for enabling automatic activities within an industrial control environment, comprising:
    receiving a desired action;
    evaluating the desired action to establish a workflow to achieve the desired action; and
    selectively initiating one or more modules that perform at least one step included in the workflow.

14. The method of claim 13, wherein the selectively initiating one or more modules comprises sequentially invoking each of the modules based on the workflow.

15. The method of claim 13, wherein the evaluating the desired action to establish a workflow to achieve the desired action comprises monitoring parameters of the desired action.

16. The method of claim 13, wherein the receiving a desired action comprises receiving one or more modules through a user selection.

17. The method of claim 13, further comprising requesting feedback information.

18. The method of claim 17, farther comprising reevaluating the desired action to establish a different workflow if the feedback indicates poor performance.

19. The method of claim 18, farther comprising performing machine learning to track and improve performance.

20. A system for autonomously performing activities in an industrial automation environment, comprising:
    a user interface component that accepts a user input that includes a desired end result;
    a MES Appliance that determines one or more actions needed to achieve the desired end result, wherein the MES Appliance selectively invokes at least one interchangeable module to perform the one or more actions, and wherein the MES Appliance initiates the at least one interchangeable module at a proper time to achieve the desired end result;
    a construction component that configures the at least one interchangeable module to perform the one or more actions; and
    a sequencing engine that determines a sequence for performing the one or more actions.

* * * * *